United States Patent [19]

Loewenthal

[11] 4,068,756
[45] Jan. 17, 1978

[54] CONVEYOR WITH ENDLESS CHAIN
[75] Inventor: Horst Loewenthal, Tiengen, Germany
[73] Assignee: SIG Schweizerische Industrie-Gesellschaft, Neuhausen am Rheinfall, Switzerland
[21] Appl. No.: 743,141
[22] Filed: Nov. 18, 1976
[30] Foreign Application Priority Data
Nov. 24, 1975 Switzerland .................. 15216/75
[51] Int. Cl.² .......................................... B65G 19/24
[52] U.S. Cl. .................................. 198/653; 198/731
[58] Field of Search ............ 198/343, 459, 728, 731, 198/812–816, 471, 476, 472, 648, 653

[56] References Cited
U.S. PATENT DOCUMENTS

| 3,721,330 | 3/1973 | Crawford et al. ............ 198/461 |
| 3,858,519 | 1/1975 | Masino et al. ............... 198/341 X |
| 3,934,701 | 1/1976 | Mooney et al. .............. 198/648 X |

FOREIGN PATENT DOCUMENTS 1,060,219  3/1967  United Kingdom .............. 198/731

Primary Examiner—Evon C. Blunk
Assistant Examiner—James L. Rowland
Attorney, Agent, or Firm—Spencer & Kaye

[57] ABSTRACT

In a conveying device including an endless chain guided around sprockets to follow a conveying path and to present a loop which is located out of the conveying path and which creates a gap in the conveying path, the length of the loop being adjustable to vary the length of the conveying path and the chain being arranged to convey a plurality of carriers along the conveying path with the carriers spaced at uniform intervals therealong, there are provided an auxiliary conveyor to convey the carriers across the gap and guide members for transferring the carriers to the auxiliary conveyor ahead of the gap and back to the chain beyond the gap.

8 Claims, 6 Drawing Figures

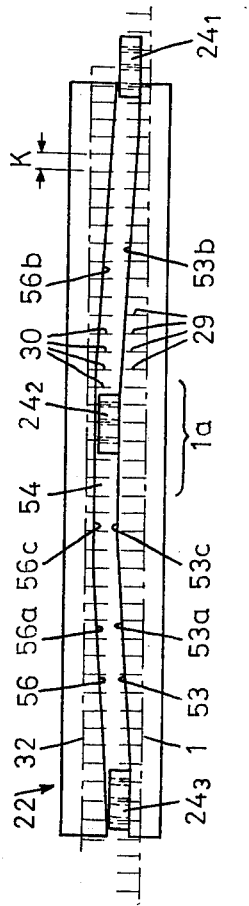
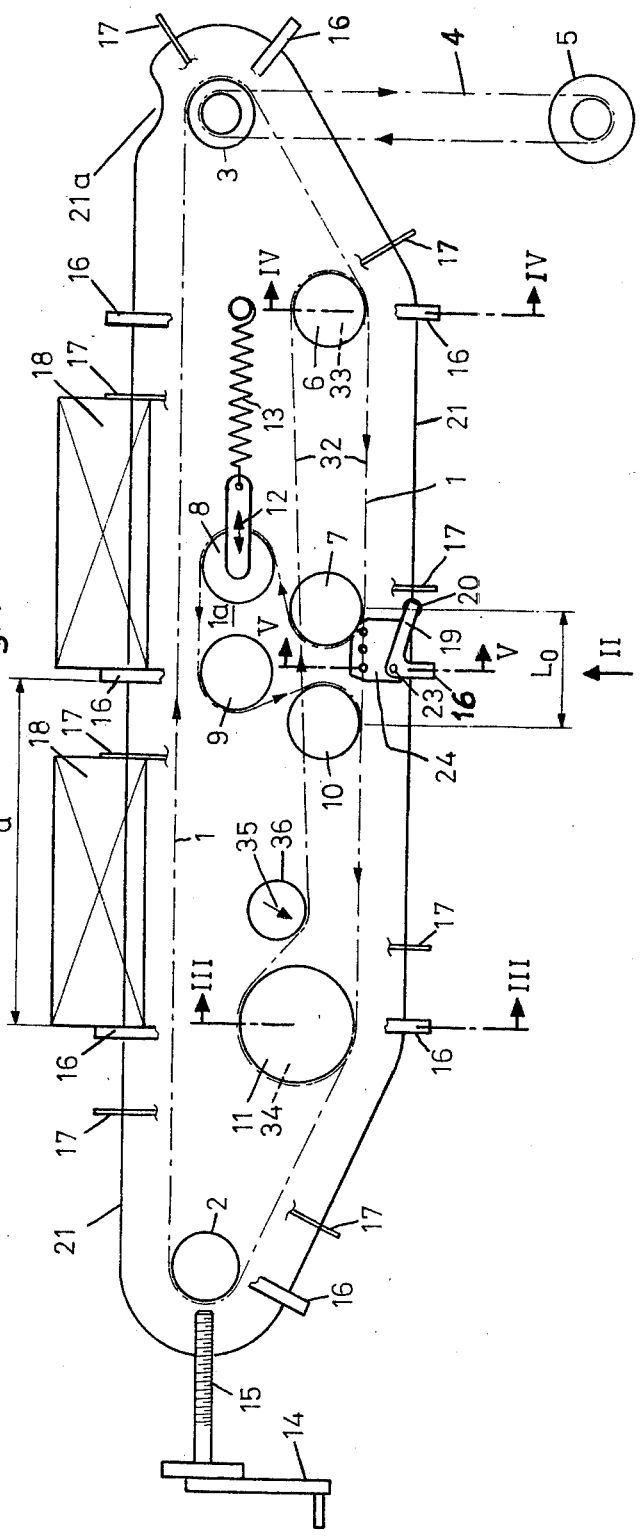

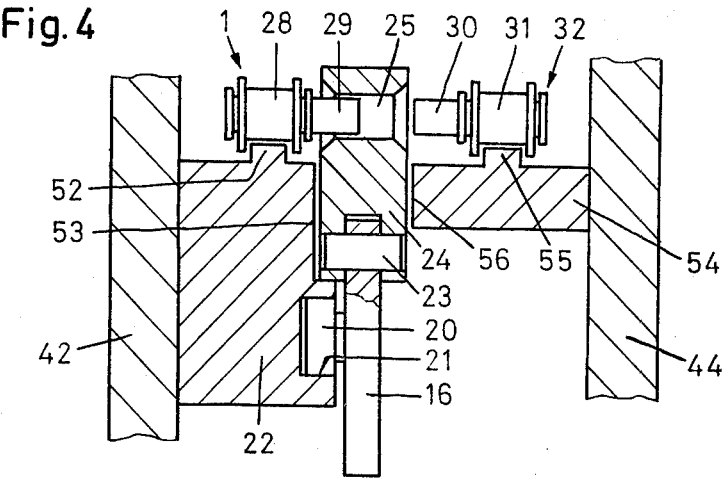
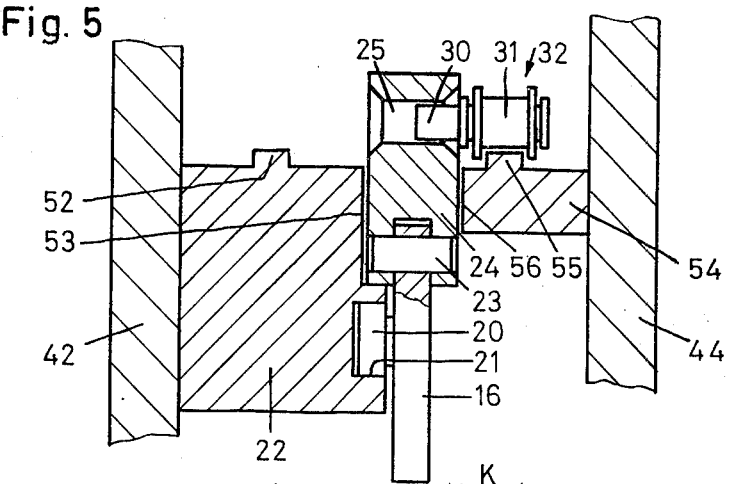
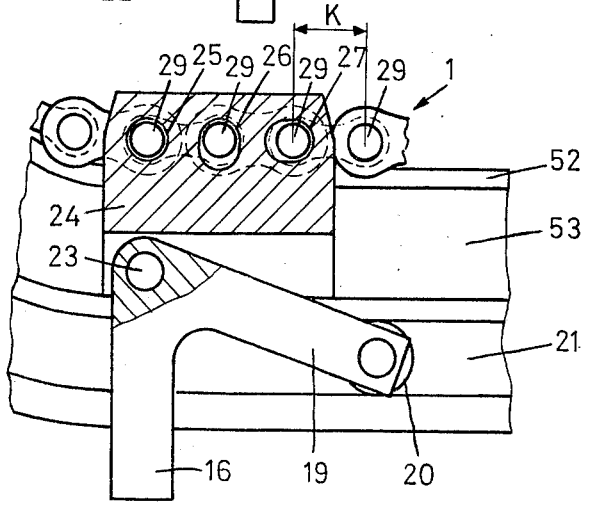

CONVEYOR WITH ENDLESS CHAIN

BACKGROUND OF THE INVENTION

The present invention relates to a conveyor of the type composed of an endless chain and carriers attached to the chain at uniform intervals, in which the chain forms a loop of adjustable length while the carriers do not follow the loop, so that when a change is made in the spacing between the carriers the effective length of the chain, excluding the loop, can be set to a whole number multiple of this spacing.

A conveying device of this type which is described in Swiss Pat. No. 412,708 and corresponding British Pat. No. 1,060,219 has the advantage that the carrier spacing can easily be adapted to change in type or size, respectively, of the objects to be conveyed, for example a series of cookies to be packaged. In this known device, the carriers have a length which enables them to bridge the space between the beginning and end of the loop and are provided with two longitudinally spaced pairs of teeth which are in engagement with the chain, and the chain is a triple-strand roller chain. During the bridging, one pair of teeth engages the chain on the downstream side to the loop, with the result that the return sprockets over which the chain is guided, at which time the length of the carrier which corresponds to two or more chain link lengths becomes tangential to the sprockets must have a large diameter. However, this is known to be a severe drawback, particularly in connection with packaging machines, for the connection of elements such as a feeder chain, folding box, transversal heating device, removal chain and the like which precede or follow the conveyor, since it may lead to complicated structures or malfunctions during operation.

SUMMARY OF THE INVENTION

It is an object of the present invention to overcome these drawbacks.

A more specific object of the invention is to eliminate the need for large diameter return sprockets in a conveyor of this type.

Simply stated, these and other objects are achieved, according to the present invention, by provision of a mechanism which temporarily transfers the carriers to an auxiliary conveying element so as to bridge the chain loop and which causes the carriers to re-engage the chain upon completion of the bridging process.

BRIEF DESCRIPTION OF THE DRAWING

FIG. 1 is a schematic side elevational view of a preferred embodiment of a conveyor according to the invention.

FIG. 2 is a partial bottom plan view of the same conveyor taken in the direction of the arrow II of FIG. 1.

FIG. 4 is a cross-sectional detail view taken along the line IV—IV of FIG. 1 and to the same scale as FIG. 3.

FIG. 5 is a cross-sectional detail view taken along the line V—V of FIG. 1 and to the same scale as FIG. 3.

FIG. 6 is a cross-sectional detail view taken along the line VI—VI of FIG. 3, with element 11 of FIG. 3 removed.

DESCRIPTION OF THE PREFERRED EMBODIMENTS

Figure 3:
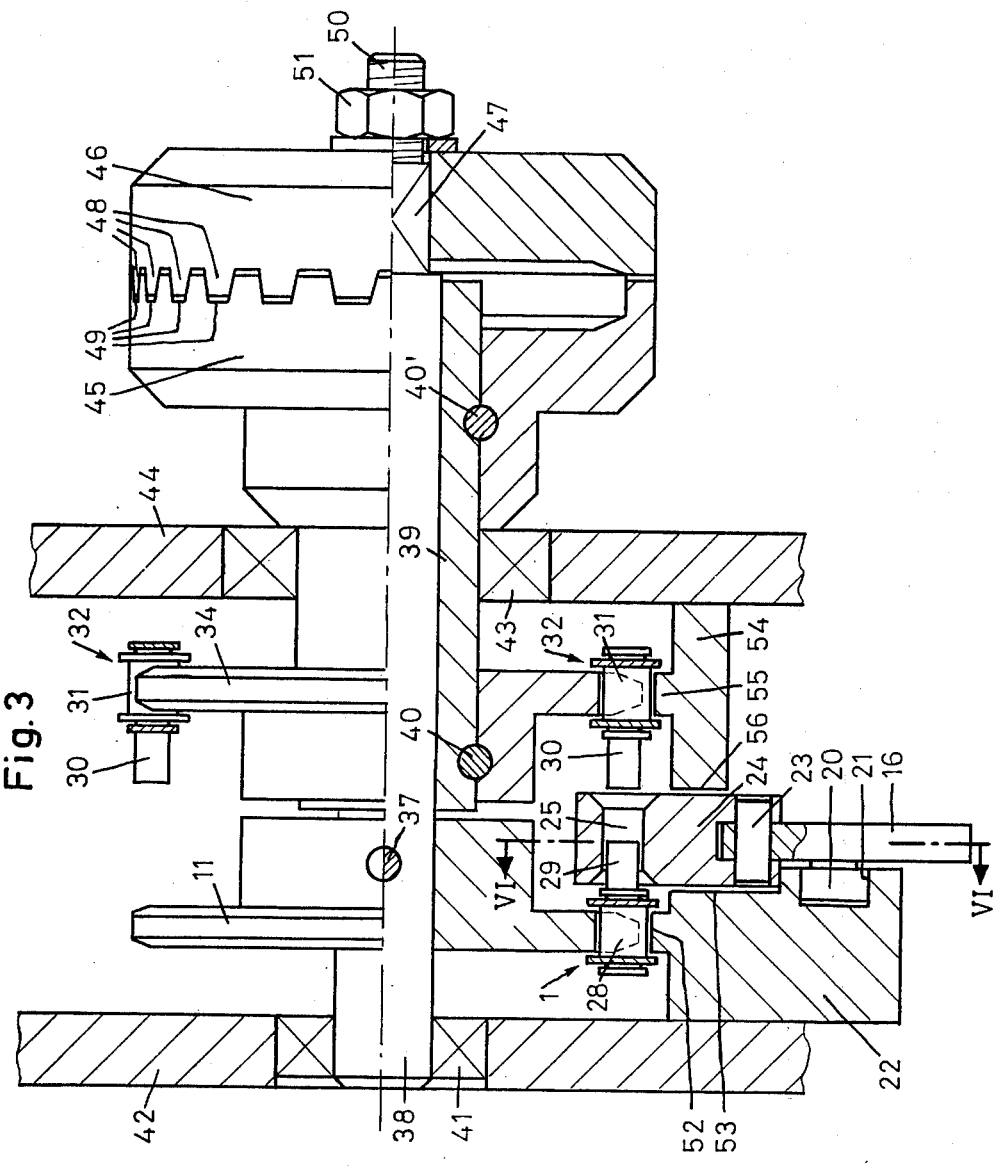
FIG. 3 is a cross-sectional detail view taken along the line III—III of FIG. 1, and to a larger scale than FIG. 1.

Referring to FIG. 1, the conveyor includes an endless chain 1 which is guided over two return sprockets 2 and 3; sprocket 3 being a drive sprocket driven by a chain drive 4 and a motor 5. The chain 1 is further guided around six deflector sprockets 6, 7, 8, 9, 10 and 11 of which one, i.e., wheel 8, is mounted to be movable in the direction of the double arrow 12 and is acted on by a tension spring 13 so that it acts as a tensioning wheel.

The bearing (not shown) for return sprocket 2 can be shifted, by the operation of a crank 14 and via a threaded sprindle 15, with respect to sprocket 3 to set the desired effective length of the endless chain 1. Such movement of sprocket 2 toward or away from sprocket 3 increases or decreases, respectively, the size of the loop 1a formed by the endless chain and deflector sprockets 7–10. Carrier fingers 16 engage chain 1 at uniform mutual spacings a, as do associated holding fingers 17, an object to be conveyed, e.g. a group of upright cookies, being held between a respective carrier finger 16 and associated holding finger 17.

Referring particularly to FIGS. 3 and 6, each carrier finger 16 is constituted by one arm of an angle lever 16, 19 whose other arm 19 is provided at its free end with a roller 20 which engages in an endless groove 21 formed in a guide 22 at the machine frame. The angle lever 16, 19 is articulated to a carrier element 24 by means of a pin 23, the carrier element being provided with three juxtaposed holes 25, 26 and 27 with slightly enlarged ends. Hole 25 is circular and has a diameter only slightly larger than pins 29 projecting laterally from the chain as an extension of the pin associated with each roller 28 of chain 1. Hole 26, on the other hand, is elongated in the direction perpendicular to the length of chain 1 and is of a size so that pin 29 of the next chain joint, when engaged in hole 26, will not touch the sides of hole 26. Hole 27 is elongated in the direction of the chain in order to assure sufficient play for the pin 29 therein when carrier element 24 passes around sprockets 2, 3 and 6–11. At the same time, however, hole 27 guides associated pin 29 perpendicularly to the direction of the chain, so that carrier element 24 cannot tip over.

Holes 25, 26 and 27 may also be engaged, via their other side, by pins 30 which project laterally from an endless auxiliary chain 32 which carries along carrier elements 24 to bridge the variable loop 1a. Each pin 30 constitutes an extension of the pin associated with each roller 31 of chain 32. The auxiliary chain 32 is guided around two return sprockets 33 and 34 which are coaxial with deflector sprockets 6 and 11 for chain 1. Chain 32 is also under the influence of a tensioning wheel 36 which acts in the direction of arrow 35. As is shown in FIG. 3, sprocket 11 of chain 1, which is the main chain, is fastened by means of a split pin 37 on a shaft 38 which is mounted in a hollow shaft 39 to which sprocket 34 for auxiliary chain 32 is fastened by means of a split pin 40. Shaft 38 is mounted, via a bearing 41, in a wall 42 of the conveyor housing and hollow shaft 39 is mounted, via a bearing 43, in a wall 44 of the housing.

One head 45 of a claw coupling 45, 46 is fastened to the hollow shaft 39 by means of a split pin 40', while the other head 46 is axially displaceable on a squared end 47 of shaft 38. In the illustrated coupling position, head 46 with its claws 48 engages in the corresponding recesses 49 of head 45 and is held in this position by a nut 51 seated on a threaded extension 50 of square end 47. The pitch of claws 48 and recesses 49 corresponds precisely to the length K, indicated in FIG. 6, of each link of chains 1 and 32, these chains having links of identical length. If coupling 45, 46 is disengaged and head 46 is angularly displaced, in one or the other direction relative to head 45, by an integral multiple of the claw pitch, a corresponding number of links of chain 1 will be pulled past sprocket 11.

Guide 22 serves not only to guide roller 20 but also to guide the main chain 1 and the carrier element 24, i.e., by means of a rib 52 and a lateral surface 53, respectively. At the other side of carrier element 24, there is disposed a further guide 54 which is fixed to the machine frame and guides the auxiliary chain 32 by means of a rib 55. Guide 54 also has a lateral surface 56 which helps to guide carrier element 24. In FIG. 2, guides 22 and 54 and their side surfaces 53 and 56 which guide carrier elements 24 are shown in a bottom view. The two chains 1 and 32 with their pins 29 and 30, respectively, are shown in dash-dot lines, in the region between sprockets 6 and 11 or 33 and 34, respectively. The lateral surfaces 53 and 56, which are mutually parallel at every point, form two ramps 53a, 53b, and 56a, 56b, respectively, which are oblique with respect to the length of the chains and are in communication with one another via respective short center pieces 53c and 56c which are parallel to the length of the chains.

It can be seen that carrier element $24_1$ engages three pins 29 of main chain 1 and is carried along by the chain. Ramp 53b subsequently pushes carrier element $24_1$ against the auxiliary chain 32 so that it is pushed onto pins 30 and is temporarily seated on pins 29 as well as pins 30. At the start of loop 1a, i.e., at wheel 7, the transfer of the carrier element onto pins 30 has been completed as is shown for the next carrier element $24_2$, so that this element, in order to bridge loop 1a, is carried only by the auxiliary chain 32. Ramp 56a then pushes carrier element $24_2$ back onto pins 30 of the main chain 1, as is shown for carrier element $24_3$. Guides, which are not shown, supplement guides 22 and 54 over the entire length of the main chain 1 insofar as required to assure lateral guidance of carrier elements 24. At least at one point, however, one lateral guide can be removed, e.g. folded out of the way, in order to add carrier elements 24 to, or remove them from, chain 1.

The holding fingers 17 are attached to carrier elements which are not shown and which are similar to carrier elements 24, these fingers 17 being constituted by, for example, a flexible leaf spring which is fastened directly to the associated carrier element and which will not exert undue pressure on the frontal face of object 18 even when the length of the object is at the maximum of its tolerance range. In order to prevent each carrier finger 16 from exerting undue pressure on the rear surface of the object 18 it is pushing, as would be the case if it were always to remain perpendicular to chain 1, a dip 21a is provided in groove 21, the groove being otherwise parallel to chain 1, which dip causes angular lever 16, 19 to be pivoted so that when carrier finger 16 begins traveling around sprocket 3, it remains parallel to the position which it maintained while traveling with the upper reach of chain 1. Thus, while finger 16 is moving out of contact with object 18, the finger is prevented from tilting forward to bear obliquely against the rear face of that object.

To facilitate understanding of the mode of operation and advantages of the described conveyor, the following is noted:

The effective length $L_w$ of main chain 1 is equal to the actual length of this chain, minus the respective length of loop 1a, plus the bridging length $L_o$, shown in FIG. 1, of the loop. The effective length $L_w$ of the chain must always be a whole multiple $m$ of the carrier spacing $a$ and a whole multiple $n$ of the length K of a chain link, i.e., $L_w = m \cdot a = n \cdot K$.

It can easily be seen that it is sufficient to be able to vary $n$ by a few units, e.g. about 10 units, to be able to obtain numerous possibilities, $m_1 \cdot a_1$, $m_2 \cdot a_2$, $m_3 \cdot a_3$, etc., corresponding to the respective size of the objects 18 being conveyed, to fulfill the condition $L = m \cdot a$. In order to permit setting of the claw coupling 45, 46 in the direction to reduce $L_w$, the bearing of return sprocket 2 will be moved to the right, with respect to the view of FIG. 1, as far as necessary to permit the desired change and then sprocket 2 will be moved to the left again until chain 1 is tensioned. To increse $L_w$, however, only the latter step need be taken.

Since the relatively short carrier element 24 is resting on three pins 29 of the main chain 1 but has sufficient play with respect to two of the pins so that it can adjust itself in the tangential direction even if a travel direction change takes place around a very small diameter return sprocket 2 or 3, respectively, the above-mentioned drawback of the known conveying device, resulting from the requirement that the return sprockets have a large diameter, is avoided. Carrier element 24 may be short because it need not, as in the known device, itself bridge the chain loop 1a, i.e., need not be at least as large as $L_o$.

Instead of auxiliary chain 32 it would also be possible to provide a different conveying element to transport carrier elements 24 over length $L_o$ to bridge loop 1a, e.g. a worm conveyor or a cam or clutch controlled conveying arm. The auxiliary chain 32, however, is advisable and inexpensive, particularly since it, as well as the main chain, involves an inexpensive single-strand roller chain while in the known conveying device an expensive triple-strand roller chain was required.

It will be understood that the above description of the present invention is susceptible to various modifications, changes and adaptations, and the same are intended to be comprehended within the meaning and range of equivalents of the appended claims.

What is claimed is:

1. In a conveying device including an endless main chain, a plurality of first sprockets around which the chain is guided, the sprockets being arranged to cause the chain to travel along a path having a first portion of adjustable length and presenting a gap, and a second portion defining a loop of adjustable length and extending between the edges of the gap, the first portion and the gap together defining a conveying path and the loop being located out of the conveying path, a plurality of carriers arranged to be driven by the chain along the conveying path and spaced at uniform intervals along the conveying path, and means for adjusting the length of the loop, in order to vary the length of the conveying path to permit a change in the spacing between carriers, the improvement wherein: said device comprises auxiliary conveyor means disposed for conveying said carriers across the gap in said conveying path, and transfer means for transferring said carriers from driving association with said chain to said auxiliary conveyor ahead of said gap and returning said carriers to operative association with said chain beyond said gap; said auxiliary conveyor means comprise an endless auxiliary chain provided with carrier-engaging pins projecting laterally from said auxiliary chain, a respective pin being connected to each link of said auxiliary chain, and a plurality of auxiliary sprockets around which said auxiliary chain is guided, said auxiliary sprockets being arranged to travel along a path having a portion which extends parallel to part of the first portion of said main chain and across said gap, said auxiliary chain being disposed to one side of said main chain with said pins projecting toward said main chain; said main chain is provided with carrier-engaging pins projecting laterally from said main chain toward the side at which said auxiliary chain is disposed; said carriers are provided with means arranged to be engaged by adjacent pins on either of said chains; and said transfer means present guide surfaces acting on said carriers to shift each said carrier at a location ahead of said gap from engagement with pins on said main chain to engagement with pins on said auxiliary chain, and at a location beyond said gap from engagement with pins on said auxiliary chain to engagement with pins on said main chain.

2. An arrangement as defined in claim 1 wherein said means for adjusting the length of said loop comprise a coupling connected between one of said first sprockets and one of said auxiliary sprockets for angularly displacing said one first sprocket relative to said one auxiliary sprocket by an amount such that the periphery of said one first sprocket moves relative to said one auxiliary sprocket through a distance equal to an integral of the length of each link of said main chain.

3. An arrangement as defined in claim 2 wherein said coupling is a claw coupling provided with claws having a pitch corresponding to the length of each link of said main chain.

4. An arrangement as defined in claim 1 wherein said means on said carriers arranged to be engaged by adjacent pins are defined by three through holes in each said carrier extending transversely to said conveying path and arranged to receive three adjacent pins on either of said chains, a first one of said holes being dimensioned to be in force transmitting relation with an associated pin, a second one of said holes being dimensioned so that its sides remain out of contact with an associated pin, and the third one of said holes being dimensioned to cooperate with an associated pin to prevent tilting of said carrier relative to said conveying path.

5. An arrangement as defined in claim 4 further comprising a plurality of carrier fingers each pivotally connected to a respective carrier and arranged to apply a conveying force to an object to be conveyed.

6. An arrangement as defined in claim 5 wherein: the number of said carrier fingers is equal to half the number of said carriers; every second carrier along said conveying path is provided with a respective carrier finger; and further comprising a plurality of flexible holding fingers each connected to a respective intervening carrier, each said holding finger cooperating with a respective adjacent carrier finger to retain a respective object being conveyed.

7. An arrangement as defined in claim 1 wherein said means for adjusting the length of said loop comprise a coupling connected to one of said first sprockets for angularly displacing said one first sprocket relative to at least one other first sprocket by an amount such that the periphery of said one first sprocket moves relative to said one other first sprocket through a distance equal to an integral multiple of the length of each link of said main chain.

8. An arrangement as defined in claim 7 wherein said coupling is a claw coupling provided with claws having a pitch corresponding to the length of each link of said main chain.

* * * * *